US012803414B2

(12) United States Patent
Kadam et al.

(10) Patent No.: US 12,803,414 B2
(45) Date of Patent: Nov. 17, 2026

(54) TRANSITIONAL USB PD (POWER DELIVERY) DUAL PORT RECEPTACLE WITH SMART BYPASS CIRCUIT

(71) Applicant: EATON INTELLIGENT POWER LIMITED, Dublin (IE)

(72) Inventors: Nilesh Ankush Kadam, Pune (IN); Stanislav Popelka, Zatec (CZ)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 19/229,118

(22) Filed: Jun. 5, 2025

(65) Prior Publication Data

US 2025/0300543 A1 Sep. 25, 2025

Related U.S. Application Data

(63) Continuation of application No. 18/244,075, filed on Sep. 8, 2023, now Pat. No. 12,348,121.

(60) Provisional application No. 63/405,017, filed on Sep. 9, 2022.

(51) Int. Cl.
*H02M 1/00* (2007.01)
*G06F 1/26* (2006.01)
*H02J 7/04* (2006.01)

(52) U.S. Cl.
CPC ............ *H02M 1/0067* (2021.05); *G06F 1/26* (2013.01); *G06F 2213/0042* (2013.01); *H02J 7/04* (2013.01); *H02J 2207/20* (2020.01)

(58) Field of Classification Search
CPC .... G06F 1/26; G06F 1/266; G06F 2213/0042; H02J 7/04; H02J 2207/30; H02M 1/0067; H02M 3/33507
See application file for complete search history.

(56) References Cited

U.S. PATENT DOCUMENTS

| | | | | |
|---|---|---|---|---|
| 2017/0093290 | A1* | 3/2017 | Qiu | H02M 3/335 |
| 2021/0111578 | A1* | 4/2021 | Ou | G06F 1/266 |
| 2021/0223838 | A1* | 7/2021 | Yeh | G06F 1/266 |
| 2022/0271645 | A1* | 8/2022 | Chang | H02M 1/008 |
| 2022/0302846 | A1* | 9/2022 | Liu | H02M 3/158 |
| 2022/0350388 | A1* | 11/2022 | Lin | G06F 1/266 |
| 2023/0299685 | A1* | 9/2023 | Joshi | H02M 3/33507 |

* cited by examiner

*Primary Examiner* — Ryan Johnson
(74) *Attorney, Agent, or Firm* — Eckert Seamans Cherin & Mellott, LLC

(57) ABSTRACT

A transitional USB receptacle has one USB PD port and one USB-C port (non-PD). The receptacle includes flyback topology for AC/DC conversion, a bypass circuit, a buck converter, and a USB controller that determines the voltage demands of external devices connected to the USB-C and PD ports. The flyback topology uses a transformer with two sets of windings that produce different output voltages. The bypass switch is configured to ensure that only voltage signals under 10V are input to the buck converter, resulting in a different one of the transformer output voltages being input to the buck converter under different load demands. This enables the buck converter to more efficiently produce a 5V at the USB-C port when the USB PD port needs to simultaneously supply either 15V or 20V, and also enables the buck converter to more efficiently produce a 5V or 9V output at the USB PD port.

10 Claims, 3 Drawing Sheets

Bypass Circuit

TRANSITIONAL USB PD (POWER DELIVERY) DUAL PORT RECEPTACLE WITH SMART BYPASS CIRCUIT

CROSS REFERENCE TO RELATED APPLICATIONS

This application claims priority to U.S. patent application Ser. No. 18/244,075, filed on Sep. 8, 2023, which application claims priority to U.S. Provisional Patent Application Ser. No. 63/405,017, filed Sep. 9, 2022, entitled TRANSITIONAL USB PD DUAL PORT RECEPTACLE WITH SMART BYPASS CIRCUIT.

FIELD OF THE INVENTION

The disclosed concept pertains generally to USB receptacles and, more particularly, to USB receptacles that support both USB PD (power delivery) protocol and USB-C protocol.

BACKGROUND OF THE INVENTION

The designs of many electric devices have evolved to use USB connectors for charging instead of pronged electrical plugs. Accordingly, modern electrical receptacles have evolved to include one or more USB ports in place of or in addition to traditional sockets. USB receptacles include circuitry to convert utility power to that which is usable by the USB ports, and also include a controller to control operation of the USB ports. The USB ports can be used to charge a variety of electronic devices such as phones, tablets, and laptops.

USB Type C (USB-C), USB Type A (USB-A), and USB PD (power delivery) protocols are all commonly implemented in electronic devices, and it is expected that many people who own multiple USB-enabled devices would find at least two different USB protocols among their devices. Charging multiple USB devices simultaneously from a single USB receptacle can be challenging, as USB protocols vary among commonly-used consumer goods, and power charging requirements can vary across different USB protocols. For example, USB PD devices have higher power charging requirements than USB-C and USB-A devices do. USB-C and USB-A receptacles do not support USB PD devices, thus, only electrical receptacles that include separate ports for supporting USB-C/USB-A devices and separate ports for supporting USB PD devices can be used to simultaneously charge both a USB-C/USB-A device and a USB PD device. An electrical receptacle that supports more than two or more USB protocols having different output voltage requirements can be referred to as a "transitional" USB receptacle.

Existing transitional USB receptacles that support both the USB-PD protocol and either the USB-C or USB-A protocol face a challenge in being able to simultaneously meet both the higher charging requirements of USB PD devices and the lower charging requirements of USB-C/USB-A devices, due to form factor limitations imposed by applicable standards developing organizations, such as NEMA (National Electrical Manufacturers Association). In particular, the power input and output requirements for USB PD and USB-C/USB-A devices established by NEMA differ significantly enough to warrant providing independent supply voltages to each of the USB PD port and the USB-C/USB-A port, and these requirements lead to transitional receptacles having an undesirable high power density. Known transitional devices typically use a flyback topology AC/DC converter to provide a USB PD charging output, followed by a synchronous buck converter to provide a USB-C/USB-A charging output. The synchronous buck converter needs to be able to operate with a 98% to 100% duty cycle with a wide input voltage range (e.g. a voltage range spanning 20 V), due to USB PD protocol requiring that a USB PD port be able to provide 5V, 9V, 15V, and 20V voltage outputs, while USB Type C protocol requires that a USB-C port be able to output close to 5V. Balancing the wide input voltage range and need for high efficiency at high input voltage presents a challenge.

There is thus room for improvement in USB receptacles.

SUMMARY OF THE INVENTION

These needs, and others, are met by embodiments of a transitional USB receptacle that has one USB PD (power delivery) port and one USB-C port (non-PD). The receptacle includes flyback topology for AC to DC conversion, a bypass circuit, a buck converter, and a USB Type C PD controller that determines the voltage demands of external devices connected to the USB PD and USB-C ports. The flyback topology uses a transformer with two sets of windings that can produce different output voltages for the PD and non-PD ports. The bypass switch is configured to be actuated in order to ensure that only voltage signals under 10V are input to the buck converter, resulting in a different one of the transformer output voltages being input to the buck converter depending on the particular voltage load demands of the external devices connected to the receptacle at any given time. This enables the buck converter to more efficiently produce a 5V at the USB-C port when the USB PD port needs to simultaneously supply either 15V or 20V, and also enables the buck converter to more efficiently produce a 5V or 9V output at the USB PD port.

In one exemplary embodiment of the disclosed concept, a transitional USB receptacle is configured to simultaneously power up to two external USB-enabled devices, the two external USB-enabled devices including an external USB PD device and an external USB-C device. The USB receptacle comprises: a USB PD port structured to connect to a USB PD plug of the external USB PD device; a USB-C port structured to connect to a USB-C plug of the external USB-C device; a plurality of prongs structured to electrically connect the transitional USB receptacle to an AC power supply; and circuit architecture comprising an AC/DC power conversion stage and a power output optimization stage. The AC/DC power conversion stage is configured to convert AC power received by the plurality of prongs to DC power. The power optimization stage comprises a bypass circuit, a buck converter, and a Type C PD controller configured to interface with the USB PD port, the USB-C port, and the AC/DC power conversion stage. The AC/DC power conversion stage is configured to simultaneously produce a first voltage output Vout1 and a second voltage output Vout2, with Vout2 being lower voltage than Vout1. The bypass circuit is configured to enable only one of Vout1 or Vout2 to be input to the buck converter at any given time and to prevent voltage signals of 10 volts and higher from being input to the buck converter. The bypass circuit is further configured to ensure that, when the external USB PD device requires the USB PD port to output voltages greater than 10 volts, Vout2 gets connected to the input of the buck converter.

BRIEF DESCRIPTION OF THE DRAWINGS

A full understanding of the invention can be gained from the following description of the preferred embodiments when read in conjunction with the accompanying drawings in which.

DETAILED DESCRIPTION OF EXEMPLARY EMBODIMENTS

Figure 1:
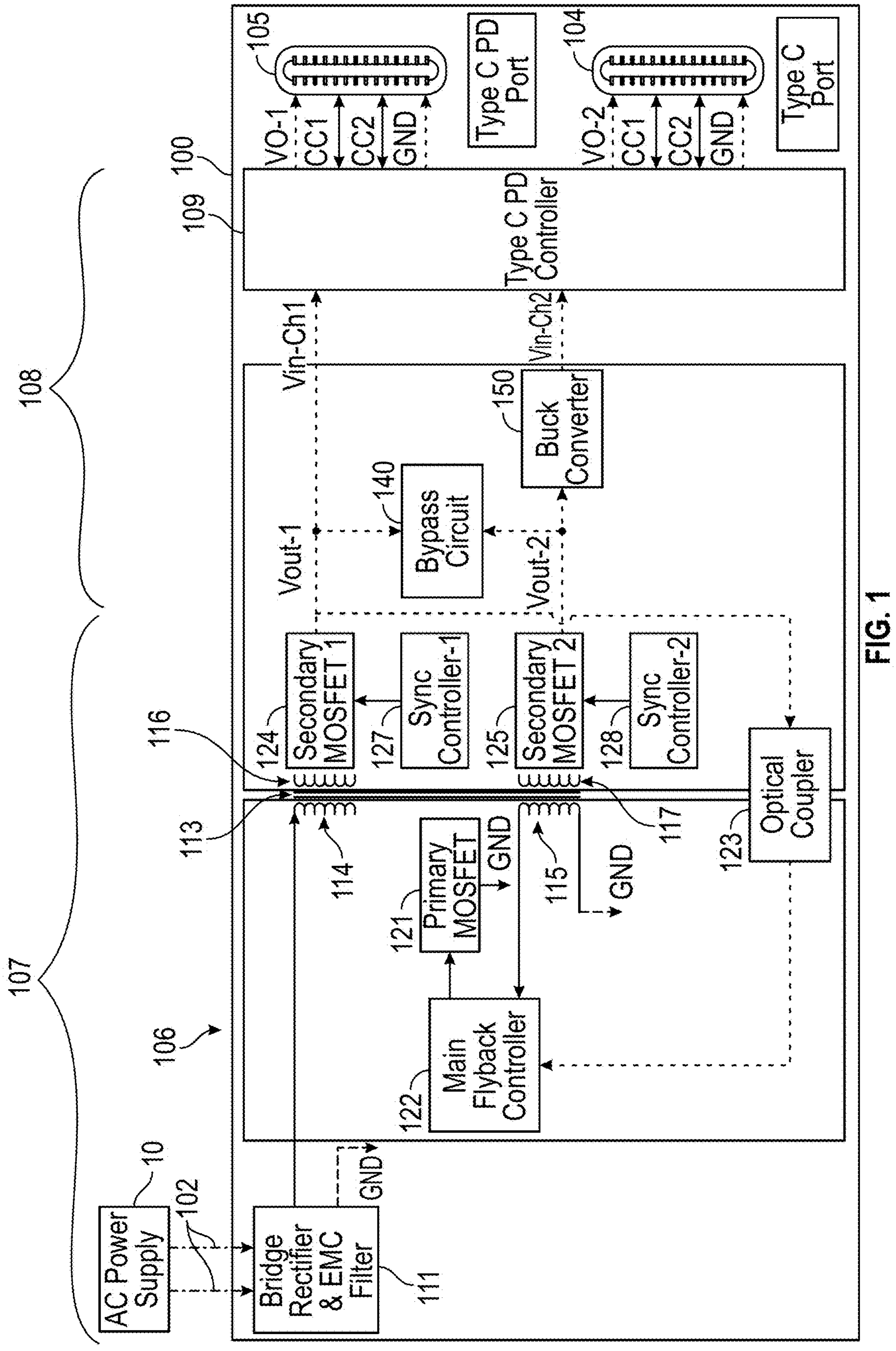
FIG. 1 is a block diagram of an improved transitional USB dual port receptacle that enables simultaneous charging of USB PD devices with higher power charging requirements and USB Type C devices with lower power charging requirements, in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As used herein, the singular form of "a", "an", and "the" include plural references unless the context clearly dictates otherwise.

As employed herein, the statement that two or more parts are "coupled" together shall mean that the parts are joined together either directly or joined through one or more intermediate parts or components, so long as a link occurs.

As employed herein, when ordinal terms such as "first" and "second" are used to modify a noun, such use is simply intended to distinguish one item from another, and is not intended to require a sequential order unless specifically stated.

As employed herein, the term "number" shall mean one or an integer greater than one (i.e., a plurality).

As employed herein, the term "controller" shall mean a programmable analog and/or digital device that can store, retrieve, and process data; a microprocessor; a microcontroller; a microcomputer; a central processing unit; or any suitable processing device or apparatus.

As employed herein, the term "transitional USB receptacle" and variations thereof such as "transitional receptacle" refers to an electrical receptacle that supports the USB PD protocol and at least one additional USB protocol.

Figure 2:
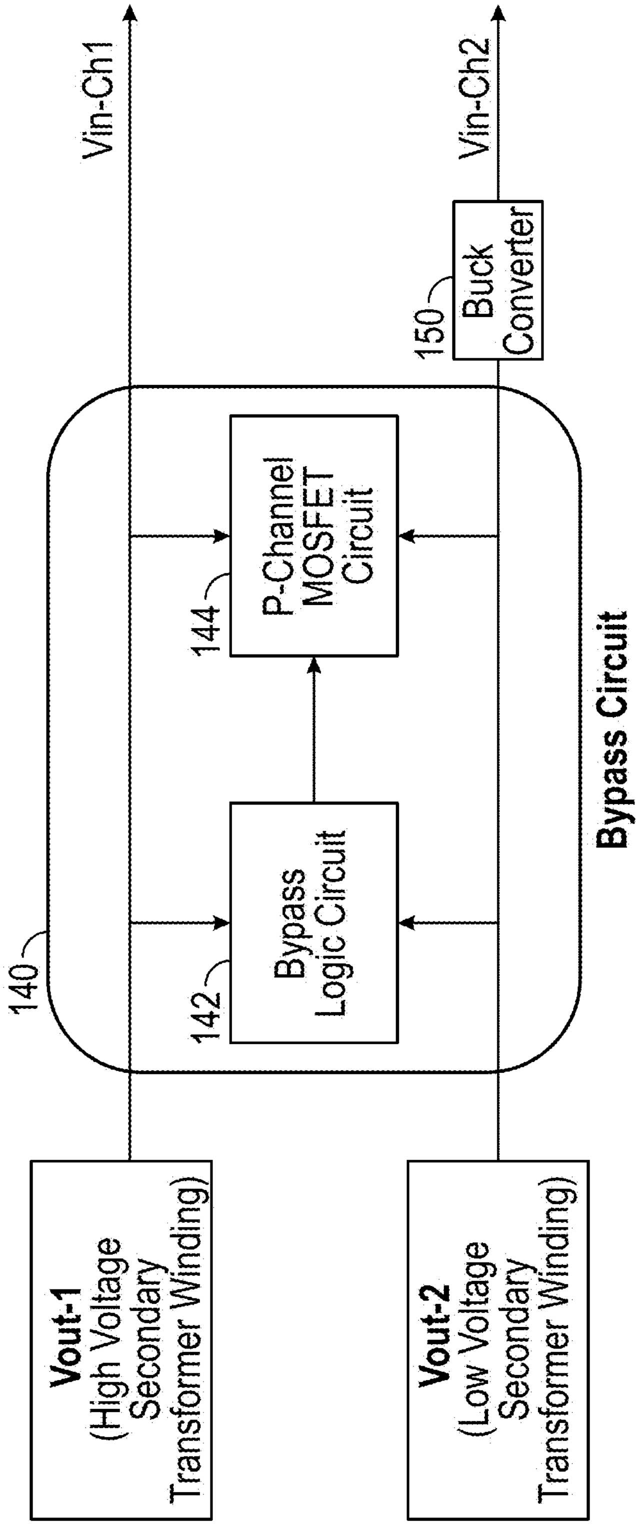
FIG. 2 is a block diagram of a bypass circuit shown in FIG. 1, in accordance with an example embodiment of the disclosed concept.
Figure 3:
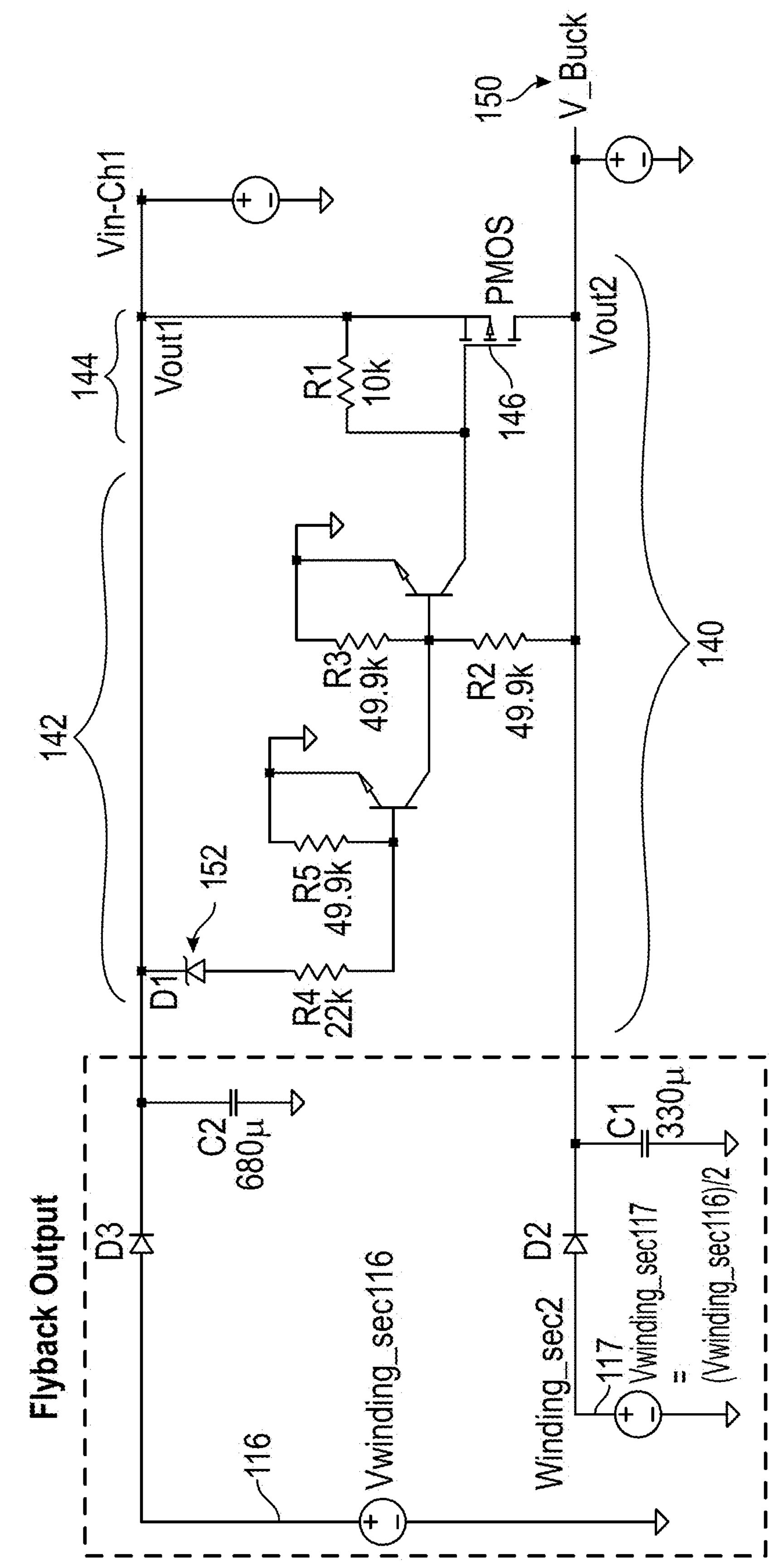
FIG. 3 is a circuit schematic of the bypass circuit shown in FIG. 2, in accordance with an example embodiment of the disclosed concept.

As represented by the block diagram shown in FIG. 1, disclosed herein is an improved transitional USB dual port receptacle 100 that enables, from a single USB receptacle, simultaneous charging of both: (1) USB PD (power delivery) devices with higher power charging requirements, and (2) USB Type C (USB-C) devices with lower power charging requirements, in accordance with an exemplary embodiment of the disclosed concept. The transitional USB dual port receptacle 100 is referred to hereinafter as the "transitional USB receptacle 100" for brevity. The disclosed transitional USB receptacle 100 provides an improved, lower power density alternative to existing transitional USB receptacles having high power density. FIG. 1 depicts the main architecture of the transitional receptacle 100, while FIGS. 2 and 3 show additional details of the dual port receptacle 100, with FIG. 2 showing a block diagram of the bypass circuit shown in FIG. 1 and FIG. 3 showing a circuit schematic of the bypass circuit shown in FIG. 2.

The transitional USB receptacle 100 is structured as an electrical receptacle comprising a plurality of prongs 102 (symbolically depicted in FIG. 1), a USB-C port 104, and a USB PD port 105. It is noted that the USB PD port 105 has a Type C interface. The prongs 102 are structured to be inserted into the openings of an electrical wall outlet in order to electrically connect the transitional USB receptacle 100 to an external AC power supply 10, such as utility/mains power. The USB-C port 104 is structured to receive a USB-C connector from an external electronic device and is configured to provide 5V of voltage input to the external device, in accordance with standard USB-C protocol. The USB PD port 105 is structured to receive a USB PD connector from an external electronic device and is configured to provide either 5V, 9V, 15V, or 20V of voltage output to the external device, depending on the demand of the particular external device connected to the USB PD port 105, in accordance with standard USB PD protocol. Hereinafter, the applicable 5V, 9V, 15V, and 20V outputs provided by the USB-C port 104 and/or the USB PD port 105 to any connected external devices can be referred to as "external device voltage input(s)".

The circuit architecture 106 of the transitional USB receptacle 100 comprises two main power stages, an AC/DC power conversion stage 107 having a flyback topology and a power output optimization stage 108 used to achieve high-efficiency DC/DC power conversion. The power output optimization stage 108 is partially implemented by a Type C PD controller 109, which provides an interface between the USB-C and USB PD ports 104 and 105 and the internal electronics of the transitional USB receptacle 100. Known transitional USB receptacles typically implement a flyback topology to produce a single DC voltage output from an AC power supply, with the single DC voltage output being capable of providing a 20V output if such an output is required by a connected external device. While the disclosed AC/DC power conversion stage 107 implements some aspects of flyback topology used by known transitional receptacles to output DC voltage from an AC power supply, the flyback topology of the disclosed AC/DC power conversion stage 107 is configured to simultaneously provide two DC voltage outputs instead of just one. Providing two DC voltage outputs with the flyback topology of the AC/DC power conversion stage 107 enables the power output optimization stage 108 to more efficiently produce the lower voltage 5V and 9V outputs that may be required by an external device connected to the USB PD port 105 and the 5V output required by an external device connected to the USB-C port 104.

The flyback topology of the AC/DC power conversion stage 107 will now be detailed. When the prongs 102 are connected to the AC power supply 10, the AC power is first input to a bridge rectifier and EMC (electromagnetic compatibility) filter 111, in order to provide full-wave rectification to the AC power supply signal and reduce noise in the AC power supply signal. The output from the bridge rectifier and EMC filter 111 is then input to a transformer 113 that is configured to be rapidly switched on and off in order to provide the DC output of the bridge rectifier and EMC filter 111 as a pulse width modulated (PWM) input to the transformer 113, as detailed further later herein. The transformer 113 comprises two primary side inductors in series and two corresponding secondary side inductors in series, the two primary side inductors including a high voltage primary side inductor 114 and a low voltage primary side inductor 115, and the two secondary side inductors including a high voltage secondary side inductor 116 and a low voltage secondary side inductor 117. The transformer 113 steps down the voltage provided by the utility/mains AC power supply 10 to lower voltages closer to those used by USB-compatible devices. It will be appreciated that the transformer 113 is set up as an inductive voltage divider, such that the voltage output by the low voltage secondary side inductor 117 is less than the voltage output by the high voltage secondary inductor 116.

The AC/DC power conversion stage 107 further comprises a primary side MOSFET 121 that is configured to act as a switch on the primary side of the transformer 113, and a main flyback controller 122 that is configured to control the primary side MOSFET 121 to switch the transformer 113 on and off. That is, the primary side MOSFET 121 is configured to be actuated between a conducting state (in which the MOSFET 121 functions as a closed switch) and a non-conducting state (in which the MOSFET 121 functions as an open switch) in order to open and close the primary side of the transformer 113, and the main flyback controller 122 is configured to control gate voltage applied to the primary side MOSFET 121 in order to actuate the primary side MOSFET 121 between its conducting state (in which the transformer 113 is in an on state) and its non-conducting state (in which the transformer 113 is in an off state). It will be appreciated that the main flyback controller 122 is configured to actuate the primary side MOSFET 121 between its conducting and non-conducting states in order to convert the DC signal produced by the bridge rectifier and EMC filter 111 to a PWM DC signal suitable to be provided as input to the transformer 113. It will be further appreciated that the main flyback controller 122 is configured to adjust the duty cycle of the PWM DC signal in order to adjust the output voltages of the transformer 113, as discussed later herein.

The output voltage signal from the high voltage secondary side inductor 116 is labeled as Vout1 in FIG. 1 and the output voltage signal from the low voltage secondary side inductor 117 is labeled as Vout2 in FIG. 1. In an exemplary embodiment, Vout2=½ Vout1. Because the on/off time of the transformer 113 needs to be controlled and adjusted in real time in order to ensure that the output voltage signals Vout1 and Vout2 are at the necessary levels, the Vout1 signal is provided as feedback to the main flyback controller 122. The Vout1 feedback signal is provided to the main flyback controller 122 though an optical coupler 123 in order to isolate the low voltage secondary side of the transformer 113 from the high voltage secondary side of the transformer 113.

The high voltage secondary side inductor 116 is connected to a first secondary side MOSFET 124 and the low voltage secondary side inductor 117 is connected to a second secondary side MOSFET 125. The first secondary side MOSFET 124 is controlled by a first synchronization (sync) controller 127 and the second secondary side MOSFET 125 is controlled by a second synchronization (sync) controller 128. The first sync controller 127 is configured to control gate voltage applied to the first secondary side MOSFET 124 in order to actuate the first secondary side MOSFET 124 between its conducting state and its non-conducting state, and the second sync controller 128 is similarly configured to control gate voltage applied to the second secondary side MOSFET 125 in order to actuate the second secondary side MOSFET 125 between its conducting state and its non-conducting state. The first sync controller 127 and the second sync controller 128 are in communication with the Type C PD controller 109 and are configured to selectively enable the Vout1 and Vout2 signals to be passed on as inputs to a bypass circuit 140 of the power output optimization stage 108 by actuating the respective first and second secondary side MOSFETs 124 and 125, based on information provided by the Type C PD controller 109, as detailed further later herein. In an exemplary embodiment of the disclosed concept, all of the primary side and first and secondary side MOSFETs 121, 124, 125 are GaN HEMTs (high electron mobility transistors).

Referring now to FIG. 2 in conjunction with FIG. 1, the Vout1 and Vout2 signals produced by the AC/DC power conversion stage 107 are configured to be provided as input to a bypass circuit 140. The bypass circuit 140 comprises a bypass logic circuit 142 and a bypass switching circuit 144. The Vout1 and Vout2 signals can be input to the bypass logic circuit 142 and to the bypass switching circuit 144, and the output of the bypass logic circuit 142 is also input to the bypass switching circuit 144. As shown in FIG. 3, the output of the bypass circuit 140 is connected to a buck converter 150, the buck converter 150 being an integrated circuit (IC) used to step down DC voltage. It is assumed that the functioning of a buck converter to produce a DC voltage output that is stepped down from a DC voltage input is understood and thus is not explained in detail herein.

Two advantageous features that distinguish the disclosed transitional USB receptacle 100 from known transitional USB receptacles should be noted prior to further detailing the bypass circuit 140. First, the disclosed transitional USB receptacle 100 is designed to prevent the buck converter 150 from having to produce outputs greater than 9V. More specifically, the buck converter 150 only outputs the 5V external device voltage input required by the USB-C port 104 and only outputs the 5V and 9V external device voltage inputs that can be required by some external devices connected to the USB PD port 105. That is, the buck converter 150 is not used to provide the 15V and 20V external device voltage inputs that can be required by certain external devices connected to the USB PD port 105. Second, the bypass circuit 140 prevents the voltage that is input to the buck converter 150 from significantly exceeding 9V. Preventing the input voltage to the buck converter 150 from significantly exceeding the 9V maximum output voltage of the buck converter 150 greatly improves the efficiency of the buck converter circuit 150 relative to buck converters in known transitional USB receptacles, as buck converters in known transitional USB receptacles typically must accept input voltages in excess of 20V in order to be able to accommodate any connected external device that requires 15V or 20V from the USB PD port of the known transitional receptacles.

Prior to discussing FIG. 3 further, it is assumed that the function of components such as current limiting resistors, diodes, capacitors, and BJTs shown in FIG. 3 are understood and thus are not explained in detail herein. In addition, it should be noted that the resistance and capacitance values indicated in FIG. 3 are provided as non-limiting examples of values that can be used for the indicated resistors and capacitors in order to demonstrate the relative magnitudes that these values generally should have among one another.

As shown in FIG. 3, the bypass switching circuit 144 comprises a p-channel MOSFET 146 (labeled "PMOS" in FIG. 3) that is configured to function as a switch between Vout1 and the input terminal of the buck converter 150. As such, the p-channel MOSFET 146 can also be referred to as the bypass switch 146. The conditions under which the p-channel MOSFET 146 functions as a closed switch (corresponding to the p-channel MOSFET 146 being in a conducting state) and under which the p-channel MOSFET 146 functions as an open switch (corresponding to the p-channel MOSFET 146 being in a non-conducting state) are detailed later herein. When the p-channel MOSFET 146 is a closed switch, Vout1 is provided as an input to the buck converter 150 (there being only a negligible voltage drop across the p-channel MOSFET 146 when it is in a conducting state). In contrast, when the p-channel MOSFET 146 is an open switch, Vout2 is provided as an input to the buck converter 150.

When an external device is plugged into either of the USB-C port 104 or the USB PD port 105 shown in FIG. 1, the Type C PD controller 109 is configured to detect the external device cable and its orientation. When an external device is plugged into the USB PD port 105, the Type C PD controller 109 performs cable detection and USB PD negotiation in order to determine what voltage input is required by the external device (i.e. 5V, 9V, 15V, or 20V). When the external USB PD device requires an input voltage of 5V or 9V, the Type C PD controller 109 enables the voltage signal to be provided at the USB PD port 105 by the buck converter 150, and when the external device requires an input voltage of 15V or 20V, the Type C PD controller 109 enables the voltage signal to be provided at the USB PD port 105 by a processed version of the Vout1 signal, i.e. a signal that results from processing the Vout1 signal to produce the applicable 20V or 15V. When an external device is plugged into the USB-C port 104, the Type C PD controller enables the voltage signal to be provided at the at the USB-C port 104 by the buck converter 150.

There are a few scenarios in which neither a 15V nor a 20V external device voltage input needs to be output by the transitional USB receptacle 100. Non-limiting examples include: when there an external device connected to the USB-C port 104 and no external device connected to the USB PD port 105, and when an external device requiring either 9V or 5V of input is connected to the USB PD port 105 (regardless of whether or not there is an external device connected to the USB-C port 104). When the Type C PD controller 109 determines that neither a 15V nor a 20V external device voltage needs to be output by the transitional USB receptacle 100, the Type C PD controller 109 causes the bypass circuit 140 to directly provide Vout1 as input to the buck converter 150. The Type C PD controller 109 accomplishes this by: (1) transmitting one control signal to cause the second sync controller 128 to actuate the second secondary side MOSFET 125 to its non-conducting state so that the Vout2 signal is not provided to the buck converter 150, and (2) transmitting another control signal to the first sync controller 127 to cause the first sync controller 127 to actuate the first secondary side MOSFET 124 between the conducting and non-conducting states so that the Vout1 voltage signal is a pulsed signal providing less than 10V and more than the 5V or 9V that the external devices connected to the USB-C port 104 and/or the USB PD port 105 require. Under these conditions, the Vout1 signal causes sufficient voltage to be supplied to the gate of the p-channel MOSFET 146 and power on the p-channel MOSFET 146 so that the p-channel MOSFET 146 acts as a closed switch, enabling Vout1 to be provided as input to the buck converter 150. In addition, under these conditions, the bypass logic circuit 142 appears as an open circuit, because the bypass logic circuit 142 includes a Zener diode 152 having a Zener breakdown voltage of 10V, with the Zener diode being connected so as to ensure that the bypass logic circuit 142 appears as an open circuit when the voltage across the Zener diode 152 is less than the breakdown voltage of 10V.

In contrast, when the Type C PD controller 109 determines that either a 15V or a 20V voltage does need to be output by the USB PD port 105, the Type C PD controller 109 causes the bypass circuit 140 to prevent Vout1 from being input to the buck converter 150. The Type C PD controller 109 accomplishes this by: (1) transmitting one control signal to the first sync controller 127 that causes the first sync controller 127 to actuate the first secondary side MOSFET 124 to its conducting state so that the Vout1 voltage signal is at least 10V, and (2) transmitting another control signal to cause the second sync controller 128 to actuate the second secondary side MOSFET 125 to its conducting state so that the Vout2 signal is connected to the bypass circuit 140 and provided as input to the buck converter 150. Under these conditions, the bypass logic circuit 142 biases the p-channel MOSFET 146 to its non-conducting state such that the p-channel MOSFET 146 functions as an open switch, because the Zener diode 152 is operating in its breakdown region, causing the voltage across the Zener diode 152 to remain steady at 10V, and thus preventing the voltage applied to the gate of the p-channel MOSFET 146 from reaching the threshold voltage. It will be appreciated that the second sync controller 128 can adjust its actuation of the second secondary side MOSFET 125 in order to produce the desired voltage level for Vout2 (depending on what the power needs of any external devices connected to the USB-C and USB PD ports 104, 105 are), but it is noted that the transitional USB receptacle 100 is configured to prevent Vout2 from significantly exceeding 9V, in order to maintain a high efficiency of the buck converter 150.

It should be noted that Vout1 is input to a first channel in the Type C PD controller 109, as indicated by the notation Vin-Ch1 in FIGS. 1-3, and that the output of the buck converter 150 is input to a second channel in the Type C PD controller 109, as indicated by the notation Vin-Ch2 in FIGS. 1-2. It will be appreciated that the Type C PD controller 109 is configured to ensure that the Vin-Ch2 voltage is used to supply 5V and 9V outputs at the USB PD port 105 and to supply a 5V output at the USB-C port 104, and to ensure that Vin-Ch2 voltage is used to supply 15V and 20V outputs at the USB PD port 105, as appropriate. In addition, it is noted that the Type C PD controller 109 and the main flyback controller 122 are also in communication with one another, and that the main flyback controller 122 also actuates the primary side MOSFET 121 as necessary to ensure that the Vout1 and Vout2 signals are sufficient to provide the voltages required by any external devices connected to the USB-C and USB PD ports 104 and 105.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A transitional USB receptacle configured to simultaneously power up to two external USB-enabled devices, the two external USB-enabled devices including an external USB PD device and an external USB-C device, the USB receptacle comprising:

a USB power delivery, PD, port structured to connect to a USB PD plug of the external USB PD device;

a USB-C port structured to connect to a USB-C plug of the external USB-C device;

a plurality of prongs structured to electrically connect the transitional USB receptacle to an AC power supply; and circuit architecture comprising:

an AC/DC power conversion stage configured to convert AC power received by the plurality of prongs to DC power; and a power output optimization stage, the power output optimization stage comprising:

a bypass circuit; and a buck converter; and a Type C PD controller configured to interface with the USB PD port, the USB-C port, and the AC/DC power conversion stage, wherein the USB-C port is configured to output voltage in a lower range with a first maximum voltage and a first minimum voltage, wherein the USB PD port is configured to output a voltage in a higher range with a second maximum voltage and a second minimum voltage, wherein the second minimum voltage exceeds the first maximum voltage, wherein the bypass circuit is configured to enable the USB PD port to output voltage in the lower range when no external USB-enabled devices connected to the USB transitional receptacle require voltage in the higher range, and wherein the Type C PD controller is configured to prevent voltage in the higher range from being input to the buck converter.

2. The transitional USB receptacle of claim 1, wherein the AC/DC power conversion stage is configured to enable simultaneous production of a first voltage output Vout1 and a second voltage output Vout2, with Vout2 being a lower voltage than Vout1, wherein the bypass circuit is configured to input Vout1 to the buck converter when at least one USB-enabled device of the two external USB-enabled devices is electrically connected to the transitional USB receptacle and no external USB-enabled device of the at least one USB-enabled device requires a voltage in the higher range to be output by the transitional USB receptacle.

3. The transitional USB receptacle of claim 1, wherein the AC/DC power conversion stage:

has a flyback topology, comprises a bridge rectifier that full wave rectifies AC power received by the plurality of prongs, includes a transformer comprising two primary side inductors in series on a primary side of the transformer, two secondary side inductors in series on a secondary side of the transformer, with the primary side of the transformer being configured to receive output from the bridge rectifier, and includes a primary side transistor switch configured to switch the primary side of the transformer between an open state and a closed state, wherein the two primary side inductors include a high voltage primary side inductor and a low voltage primary side inductor, wherein the two secondary side inductors include a high voltage secondary side inductor and a low voltage secondary side inductor, wherein a first voltage output Vout1 is output by the high voltage secondary side inductor, wherein a second voltage output Vout2 is output by the low voltage secondary side inductor.

4. The transitional USB receptacle of claim 3, wherein Vout2 provides half as much voltage as Vout1 provides.

5. The transitional USB receptacle of claim 3, wherein all transistors used in the AC/DC power conversion stage are GaN HEMTs.

6. The transitional USB receptacle of claim 3, wherein the AC/DC power conversion stage further includes:

a first secondary side transistor switch configured to be switched between an open state and a closed state in order to affect what voltage Vout1 has, a first sync controller configured to communicate with the Type C PD controller and to switch the first secondary side transistor between the open state and the closed state, a second secondary side transistor switch configured to be switched between an open state and a closed state in order to affect what voltage Vout2 has, a second sync controller configured to communicate with the Type C PD controller and to switch the second secondary side transistor between the open state and the closed state.

7. The transitional USB receptacle of claim 6, wherein the bypass circuit comprises:

a bypass logic circuit; and a bypass switching circuit, the bypass switching circuit including a bypass switch configured to be opened and closed in order to connect and disconnect Vout1 from an input of the buck converter, wherein Vout1 and Vout2 can be input to the bypass logic circuit and the bypass switching circuit, and output from the bypass logic circuit is input to the bypass switching circuit, wherein, in response to at least one external USB-enabled device being electrically connected to the transitional USB receptacle and there being no external USB-enabled device of the at least one external USB-enabled device that requires a voltage in the higher range to be output by the transitional USB receptacle, the Type C PD controller is configured to:

transmit one control signal to cause the second sync controller to switch the second secondary side transistor switch to the open state, and transmit another control signal to cause the first sync controller to switch the first secondary side transistor switch between the open state and the closed state to cause Vout1 to be a pulsed signal providing less than the second minimum voltage and more than whatever voltage is required by the at least one external USB-enabled device, and wherein transmitting the one control signal and the another control signal causes the bypass switch to close, wherein the bypass switching circuit is configured to provide Vout1 as input to the buck converter when the bypass switch is closed.

8. The transitional USB receptacle of claim 6, wherein the bypass circuit comprises:

a bypass logic circuit; and a bypass switching circuit, the bypass switching circuit including a bypass switch configured to be opened and closed in order to connect and disconnect Vout1 from an input of the buck converter, wherein Vout1 and Vout2 can be input to the bypass logic circuit and the bypass switching circuit, and output from the bypass logic circuit is input to the bypass switching circuit, wherein, in response to at least one external USB-enabled device being electrically connected to the transitional USB receptacle and one of the at least one external USB-enabled device requiring a voltage in the higher range to be output by the transitional USB receptacle, the Type C PD controller is configured to:

transmit one control signal to cause the first sync controller to switch the first secondary side transistor switch to the closed state so that Vout1 is greater than the first maximum voltage, and transmit another control signal to cause the second sync controller to switch the second secondary side transistor closed in order to cause Vout2 to be connected to the bypass circuit and to cause Vout2 to be input to the buck converter, and wherein transmitting the one control signal and the another control signal biases the bypass switch open, wherein transmitting the one control signal and the another control signal causes Vout1 to be input directly to the Type C PD controller.

9. The transitional USB receptacle of claim 7, wherein the bypass switch is a p-channel MOSFET, wherein the p-channel MOSFET is configured such that transmitting the one control signal and the another control signal enables Vout1 to provide a gate voltage to the p-channel MOSFET that exceeds a threshold voltage of the p-channel MOSFET and enables the p-channel MOSFET to operate as a closed switch.

10. The transitional USB receptacle of claim 8, wherein the bypass switch is a p-channel MOSFET, wherein the bypass logic circuit comprises a Zener diode, wherein the Zener diode is configured such that transmitting the one control signal and the another control signal causes the Zener diode to operate in its breakdown region, wherein the bypass circuit is configured such that, when the Zener diode operates in its breakdown region, the p-channel MOSFET is biased to operate as an open switch due to being prevented from receiving a gate voltage that exceeds a threshold voltage of the p-channel MOSFET.

* * * * *